United States Patent
Gu et al.

(10) Patent No.: US 8,701,626 B2
(45) Date of Patent: Apr. 22, 2014

(54) GASOLINE DIRECT INJECTION ENGINE

(75) Inventors: Young Sam Gu, Yongin-si (KR); Hyun Soo Shim, Seoul (KR); Tae Sun Kim, Hwasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 700 days.

(21) Appl. No.: 12/869,650

(22) Filed: Aug. 26, 2010

(65) Prior Publication Data
US 2011/0120410 A1 May 26, 2011

(30) Foreign Application Priority Data
Nov. 26, 2009 (KR) .................. 10-2009-0115266

(51) Int. Cl.
*F02B 19/14* (2006.01)

(52) U.S. Cl.
USPC ....................... 123/275; 123/41.35

(58) Field of Classification Search
USPC ........... 123/41.35, 46 R, 193.1, 193.4, 197.2, 123/267, 269, 273, 275, 276, 279, 285, 307, 123/659–661; 92/172, 186, 208, 181 R
See application file for complete search history.

(56) References Cited

U.S. PATENT DOCUMENTS

| | | | | |
|---|---|---|---|---|
| 4,018,194 A * | 4/1977 | Mitchell et al. | ............... | 123/276 |
| 4,259,933 A * | 4/1981 | Nakanishi et al. | ............ | 123/307 |
| 5,014,658 A * | 5/1991 | Hara et al. | .................. | 123/193.6 |
| 5,979,399 A * | 11/1999 | Piock et al. | ..................... | 123/301 |
| 6,009,849 A * | 1/2000 | Yamamoto et al. | ............ | 123/298 |
| 6,173,690 B1 * | 1/2001 | Iriya et al. | ....................... | 123/295 |
| 6,494,178 B1 * | 12/2002 | Cleary et al. | ................... | 123/276 |
| 6,588,396 B1 * | 7/2003 | Cleary et al. | ................... | 123/276 |
| 6,612,282 B2 * | 9/2003 | Yu | ................... | 123/262 |
| 6,708,667 B2 * | 3/2004 | Suzuki et al. | .................. | 123/262 |
| 6,745,745 B2 * | 6/2004 | Huebler et al. | ................ | 123/307 |
| 6,910,455 B2 * | 6/2005 | Sczepanski et al. | ........ | 123/193.6 |
| 7,383,831 B2 * | 6/2008 | Nabetani et al. | ............... | 123/661 |
| 7,971,568 B2 * | 7/2011 | Lee | ................ | 123/307 |
| 2003/0075141 A1 * | 4/2003 | Ohta et al. | ................... | 123/301 |
| 2005/0205050 A1 * | 9/2005 | Kubo et al. | ...................... | 123/260 |
| 2009/0241769 A1 * | 10/2009 | Feeser | ............... | 92/186 |
| 2010/0000493 A1 * | 1/2010 | Nishimoto et al. | ........... | 123/261 |
| 2011/0154984 A1 * | 6/2011 | De Oliveira et al. | ............ | 92/172 |

FOREIGN PATENT DOCUMENTS

JP 10-339140 (A) 12/1998
JP 2006-112241 (A) 4/2006

* cited by examiner

*Primary Examiner* — John Kwon
*Assistant Examiner* — Johnny Hoang
(74) *Attorney, Agent, or Firm* — Morgan, Lewis & Bockius LLP

(57) ABSTRACT

A gasoline direct injection engine that has an injector directly injecting fuel into a combustion chamber, a spark plug, an intake valve, and an exhaust valve and generates power by reciprocating a piston in a cylinder, may include a cavity formed on a piston head and returning some flow of the fuel injected from the injector to the intake valve, and a channel formed around the cavity.

14 Claims, 5 Drawing Sheets

GASOLINE DIRECT INJECTION ENGINE

CROSS-REFERENCE TO RELATED APPLICATION

The present application claims priority to Korean Patent Application No. 10-2009-0115266 filed in the Korean Intellectual Property Office on Nov. 26, 2009, the entire contents of which is incorporated herein for all purposes by this reference.

BACKGROUND OF THE INVENTION

1. Field of the Invention

The present invention relates to a structure of an engine. More particularly, the present invention relates to a structure of a gasoline direct injection engine having improved operational performance.

2. Description of Related Art

In general, a GDI (gasoline direct injection) technology has been developed to improve fuel efficiency and performance of an internal combustion engine. The GDI engine technology is to directly inject fuel into the combustion chamber, not into the intake pipe.

Since it is possible to directly inject fuel into the combustion chamber and produce a fuel-air mixture layer by using the GDI engine, it is possible to produce a condensed mixture by concentrate air and fuel around a spark plug. Accordingly, the engine can operate at a very small air/fuel ratio and wall wetting is reduced in comparison to injecting fuel to the intake port in the related art, such that it is possible to accurately control the amount of fuel and improve fuel efficiency and performance, and accordingly, the GDI engines are recently increasingly used.

Various methods of mixing air with fuel well and maximally concentrating an air-fuel mixture around the spark plug has been proposed to smoothly operate the engine at a small air/fuel ratio.

A vortex is generated in the axis perpendicular to the movement direction of the piston or with respect to the movement direction axis of the piston in the internal combustion engine, in which the former one is called 'tumble' and the later one is called 'swirl'.

Since the mixing ratio and concentration of the air and fuel depend on the flow level of the tumble and the swirl, design should be performed in consideration of the tumble and swirl to improve the operational performance of the GDI engine.

The tumble and swirl particularly depends on the shape of the top of the piston, the design of the top of the piston should be improved to improve the operational performance of the GDI engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a structure of a gasoline direct injection engine having advantages of improving the operational performance of a GDI engine.

In an aspect of the present invention, the gasoline direct injection engine that has an injector directly injecting fuel into a combustion chamber, a spark plug, an intake valve, and an exhaust valve and generates power by reciprocating a piston in a cylinder, may include a cavity formed on a piston head and returning some flow of the fuel injected from the injector to the intake valve, and a channel formed around the cavity.

The cavity may be formed in a circular shape or an elliptical shape and offset at a predetermined distance vertically downward from the spark plug to the intake valve.

The channel may be a groove formed around the cavity, along an outer circumference of the piston head, wherein the spark plug is disposed toward the center of the combustion chamber.

The gasoline direct injection engine may further include a protrusion formed between the cavity and the channel, extending from the cavity to one side and protruding upward.

In another aspect of the present invention, the gasoline direct injection engine that has an injector directly injecting fuel into a combustion chamber, a spark plug, an intake valve, and an exhaust valve and generates power by reciprocating a piston in a cylinder, may include a cavity formed on a piston head of the piston to return some flow of the fuel injected from the injector to the intake valve, and a channel that is a groove formed around the cavity along an outer circumference of the piston head.

The gasoline direct injection engine may further include a protrusion formed between the cavity and the channel, extending from the cavity to one side and protruding upward.

In further another aspect of the present invention, the gasoline direct injection engine that has an injector directly injecting fuel into a combustion chamber, a spark plug, an intake valve, and an exhaust valve and generates power by reciprocating a piston in a cylinder may include a cavity formed on a piston head of the piston at an intake side thereof, and a channel formed around the cavity between the cavity and an outer circumference of the piston head, wherein the cavity is fluid-connected to the channel at a junction portion formed adjacent to an edge of the piston to return some flow of the fuel injected from the injector to the intake valve along the channel The channel and the cavity may be separated by a protrusion formed therebetween and wherein the protrusion extends from upper surface of the cavity upwards, wherein the protrusion opens in a part to form the junction portion such that the channel and the cavity is fluid-connected therethrough, and wherein the junction portion is formed adjacent to the injector.

The cavity may be formed in a circular shape or an elliptical shape and a center thereof is offset at a predetermined distance from a center of the piston toward the injector, wherein the protrusion is formed in a circular shape or an elliptical shape and a center of the protrusion is offset at a predetermined distance from the center of the piston toward the injector, wherein the cavity is enclosed by the protrusion, and wherein the center of the piston, the center of the protrusion and the center of the cavity are disposed toward the injector in sequence.

Gradient of the channel may be increased from the junction portion such that a portion of the channel which is disposed farthest from the junction portion is higher than the junction portion.

The spark plug may be disposed substantially a center of the piston.

As described above, according to a structure of a gasoline direct injection engine of the present invention, it is possible to uniformly distribute fuel injected from the injector throughout the combustion chamber under general conditions by forming the cavity on the piston head and forming the channel around the cavity.

Further, it is possible to improve performance of the engine by forming strong swirl around the outer circumference of the piston such that gas mixture of which flow rate increases in a high-speed and high-load operation is prevented from flowing away from the spark plug and a predetermined amount of condensed gas mixture always remains around the spark plug.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
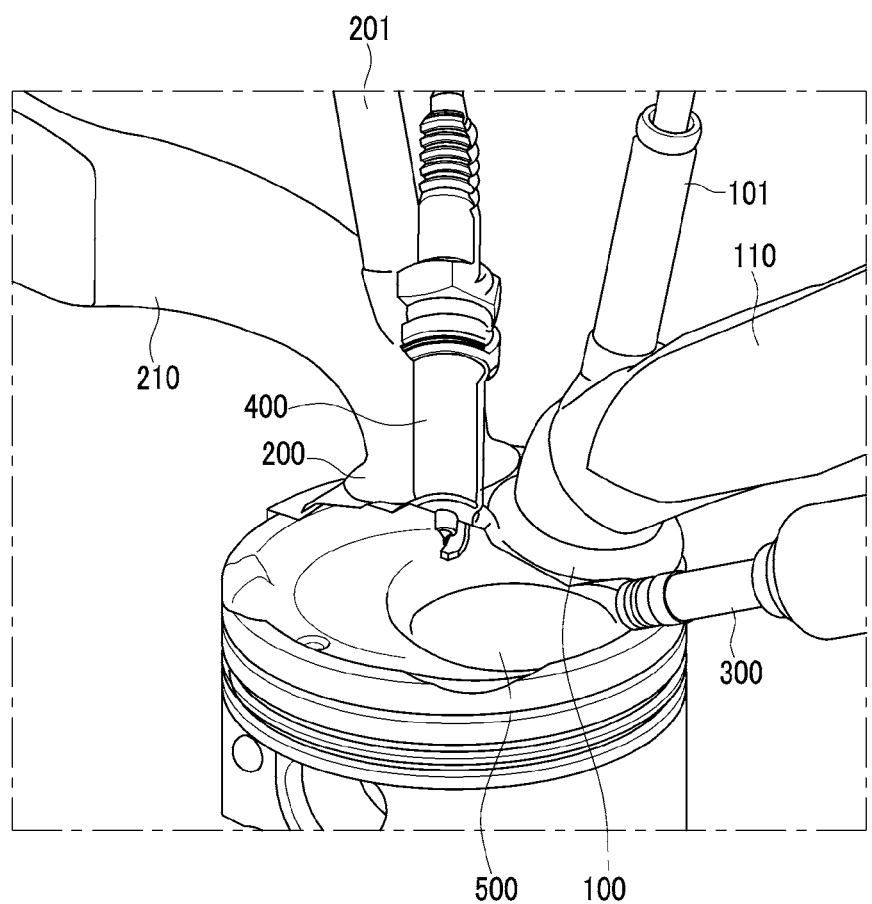
FIG. 1 is a perspective view of a gasoline direct injection engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a gasoline direct injection engine according to an exemplary embodiment of the present invention.

Figure 2:
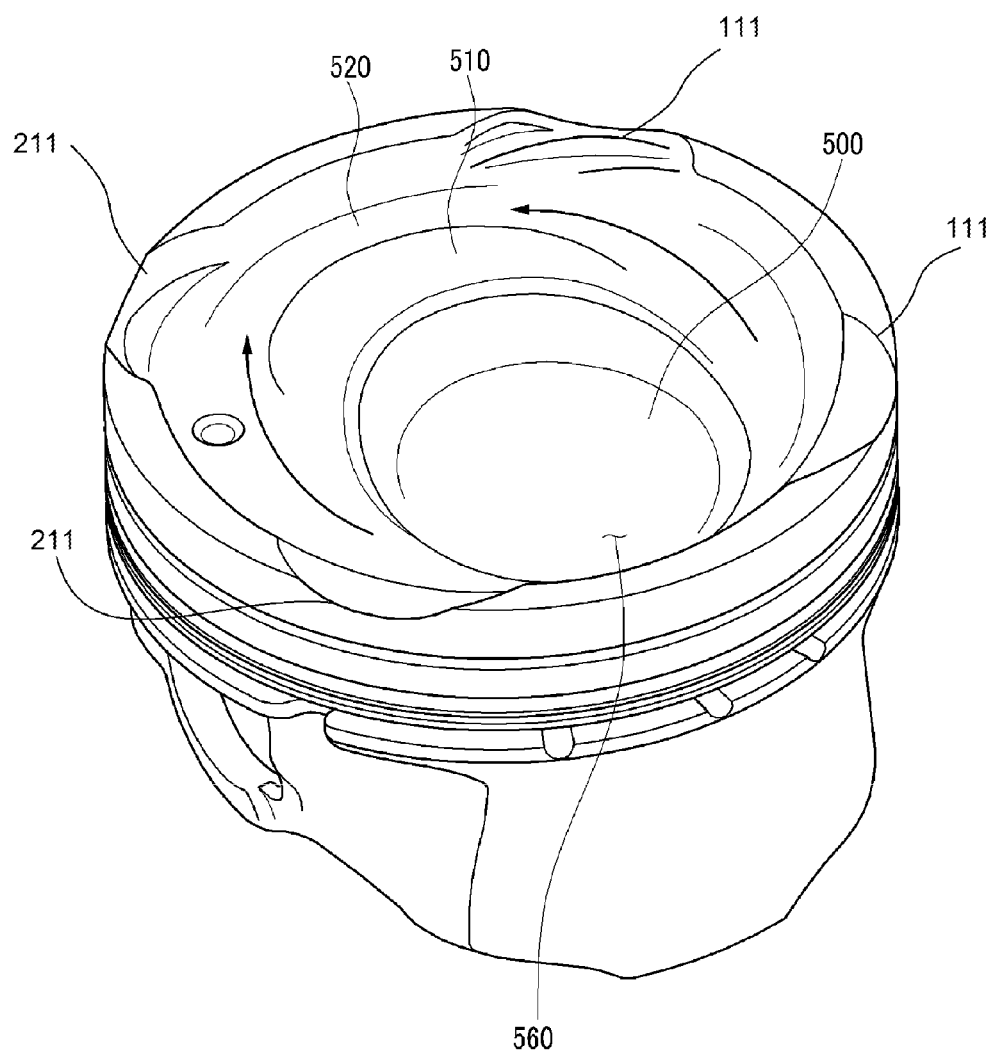
FIG. 2 is a perspective view of a piston head applied to a gasoline direct injection engine according to an exemplary embodiment of the present invention.

FIG. 2 is a perspective view of a piston head applied to a gasoline direct injection engine according to an exemplary embodiment of the present invention.

Figure 3:
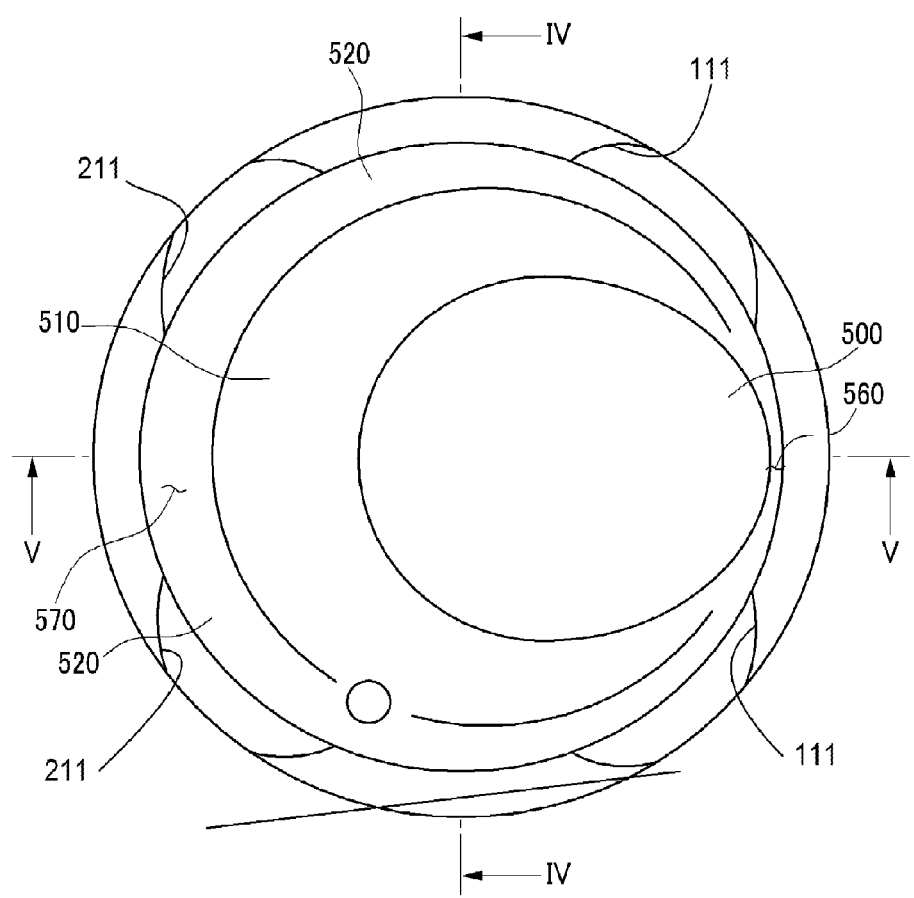
FIG. 3 is a top plan view of FIG. 2.

FIG. 3 is a top plan view of FIG. 2.

Figure 4:
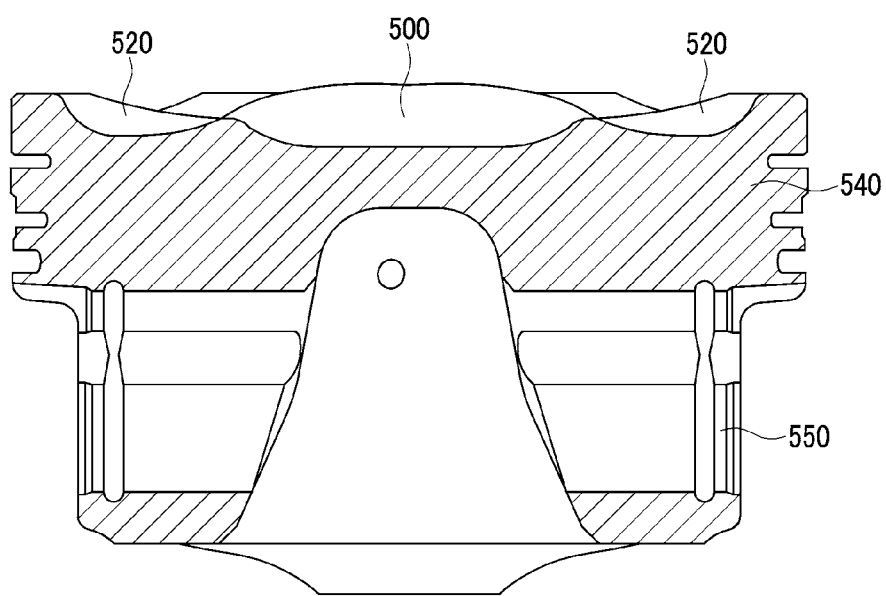
FIG. 4 is a cross-sectional view taken along line IV-IV of FIG. 3.

FIG. 4 is a cross-sectional view taken along line IV-IV of FIG. 3.

Figure 5:
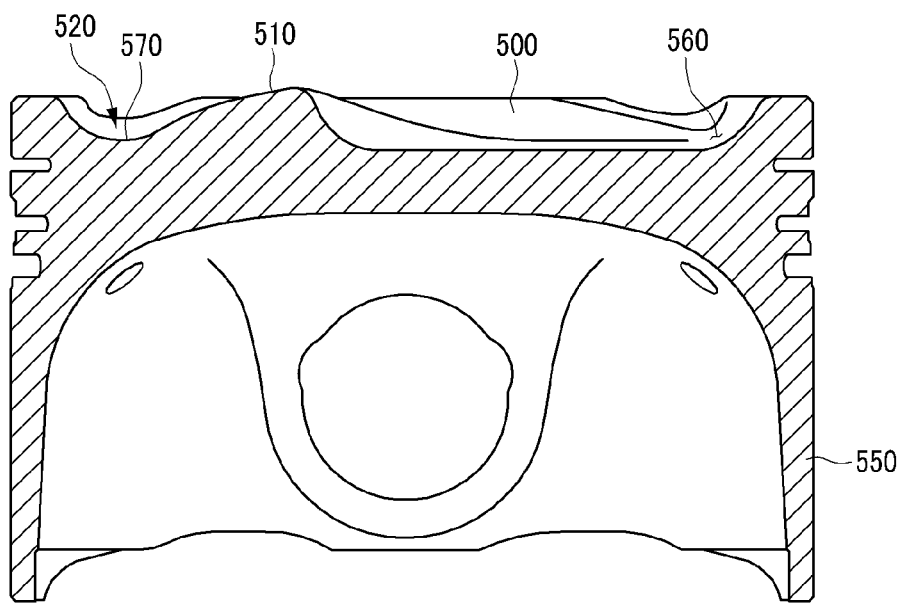
FIG. 5 is a cross-sectional view taken along line V-V of FIG. 3.

FIG. 5 is a cross-sectional view taken along line V-V of FIG. 3.

A gasoline direct injection engine according to an exemplary embodiment of the present invention, as shown in FIG. 1, includes a combustion chamber , at least a pair of intake ports 100, an intake valve 101 positioned at the inlet of the combustion chamber in the downstream of the intake port 100 and being selectively placed on an intake valve recess 111, a piston 550, a cavity 500 formed at the intake side on the piston 550, an injector 300 directly injecting fuel from the side of the cylinder into each combustion chamber, a spark plug 400, an electronic control unit (hereafter, referred to as ECU) performing combustion control, at least a pair of exhaust port 200, and a exhaust valve 201 positioned at the outlet of the combustion chamber in the upstream of the exhaust port 200 and being selectively placed on an exhaust valve recess 211.

In this configuration, the intake and exhaust valves 101 and 201 and the intake and exhaust ports 100 and 200 are two, respectively, in the drawings, but only one is shown in the present embodiment for the convenience of description.

Further, the combustion chamber means the space between the cavity 500 and the spark plug 400.

The injector 300 is formed toward the center of the combustion chamber and the cavity 500 depressed on the top of the piston 550 is formed with respect to the injection direction of the injector 300.

The intake port 100 is connected to the intake pipe 110 and the exhaust port 200 is connected to the exhaust pipe 210.

The intake valve 101 opening/closing the intake port 100 and the exhaust valve 201 opening/closing the exhaust port 200 are disposed above the cylinder head of the engine, and at an upper side of the combustion chamber.

The intake valve 101 and the exhaust valve 201, for example, are opened/closed by a valve driving mechanism having a variable valve timing function.

Meanwhile, the engine has the spark plugs 400 and the injectors 300 corresponding to the number of the cylinders, and at least a pair of the spark plugs 400 and the injectors 300 may be provided to the combustion chamber, respectively.

The spark plug 400 is mounted to the cylinder head to be positioned the center portion of the upper portion of the corresponding combustion chamber.

Further, a side injection type is used and the injector 300 is mounted to the cylinder head to be positioned at the downstream of the intake pipe 110 extending to the combustion chamber.

That is, the injector 300 directly injects fuel from the side to the corresponding combustion chamber.

Meanwhile, the cavity 500 is formed on the piston head 540, that is, the top of the piston 550 to produce desired gas mixture layer around the spark plug 400.

The cavity 500 has a substantially elliptical shape and it is preferable that the center is biased at a predetermined distance from the center of the combustion chamber to the intake port 100.

With this configuration, the gas mixture flowing inside from the intake port 100 is returned by the cavity 500 formed substantially adjacent to the intake port.

That is, the cavity 500 is entirely biased to the intake valve 101 and gradually curved upward in the flow direction of the fuel injected from the injector 300 and flows from the intake side to the exhaust side, that is, in the perpendicular direction to the longitudinal direction of the piston 550.

Further, the inclination of the bottom, the side, and the rear side of the cavity 500 is determined such that at least some of the fuel injected from the injector 300 returns to the intake valve 101.

A stratified combustion operation can be performed by the flow along the shape of the cavity 500.

Further, a protrusion 510 extending to the front of the cavity 500 is formed.

The protrusion 510 has a substantially elliptical or circular shape and it is preferable that the center is biased at a predetermined distance from the center of the combustion chamber toward the injector 300.

A channel 520 is formed along the outer circumference of the protrusion 510 between the circumference of the piston head 540 and the outer circumference of the protrusion 510 to be adjacent to the edge of the piston head 540, wherein the intake valve recess 111 and the exhaust valve recess 211 are not formed on the channel 520.

In an exemplary embodiment of the present invention, the channel 520 and the cavity 500 may be merged at a junction portion 560 adjacent to the edge of the piston head 540.

The channel 520 forms a substantially circular shape, such that the mains stream of the gas mixture is guided by the cavity 500 and the gas mixture outside the combustion chamber is induced by the channel 520, and accordingly, heavy gas mixture can be constantly produced around the spark plug 400 in the whole operation region. A portion of the gas mixture in the channel 520 may be flown into the cavity through the junction portion 560.

In an exemplary embodiment of the present invention, the slope of the channel 520 may be increased from the junction portion 560 such that a portion 570 of the channel 520 which is disposed farthest from the junction portion 560 is higher than the junction portion 560. In this configuration, the gas mixture may flow along the channel 520 to return to the intake valve 101 or the junction portion 560 and thereby heavy gas mixture can be constantly produced around the spark plug 400 in the cavity 500.

Therefore, the fuel, injected in the compression stroke, is mixed with air and the mixture is concentrated to the center of the combustion chamber by the cavity 500, the protrusion 510, and the channel 520, such that the combustion efficiency can be improved.

According to the gasoline direct injection engine having the above configuration according to an exemplary embodiment of the present invention, fuel is directly injected from the injector 300 into the combustion chamber in the stratified combustion operation.

Further, the rest of the gas mixture rotates in two directions through the channel 520 formed around the cavity 500 and concentrates again in the cavity 500, such that the above flow is repeated.

Therefore, the gas mixture layer is stratified around the spark plug 400 in the engine even if the cavity 500 is shallow, such that it is possible to achieve stable stratified combustion, using sparse fuel.

Further, since some of the fuel injected from the injector 300 is returned to the intake valve 101 by the cavity 500, it is possible to prevent the fuel injected from the injector 300 from reaching the exhaust valve-sided wall of the cylinder.

Further, in accordance with the injectors 300, at least some of the fuel directly injected into the combustion chamber returns to the intake valve 101 by the cavity formed on the piston 550 and is mixed with the air flowing inside through the intake valve 101.

Therefore, it is possible to produce a uniform gas mixture layer in the combustion chamber by directly injecting fuel into the combustion chamber from the injector 300 in the intake stroke, even if the engine operates in a high-load and high-revolution region.

Further, it is possible to accomplish good performance of the engine and reduce the thickness of the cavity as compared with related art, such that it is possible to prevent reduction of compression ratio or increase of weight of the piston.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gasoline direct injection engine that has an injector directly injecting fuel into a combustion chamber, a spark plug, an intake valve, and an exhaust valve and generates power by reciprocating a piston in a cylinder, the gasoline direct injection engine, comprising:
   a cavity formed on a piston head and inclined for returning some flow of the fuel injected from the injector toward the intake valve;
   a channel formed around the cavity and forming a close loop for continuously guiding fuel outside the cavity to the cavity or toward the intake valve; and
   a protrusion formed between the cavity and the channel, extending from the cavity to one side and protruding upward.

2. The gasoline direct injection engine of claim 1, wherein the cavity is formed in a circular shape or an elliptical shape and offset at a predetermined distance vertically downward from the spark plug to the intake valve.

3. The gasoline direct injection engine of claim 1, wherein the channel is a groove formed around the cavity, along an outer circumference of the piston head.

4. The gasoline direct injection engine of claim 3, wherein the spark plug is disposed toward a center of the combustion chamber.

5. The gasoline direct injection engine of claim 1, wherein an intake valve recess of the inlet valve and an exhaust valve recess of the exhaust valve are not formed on the channel.

6. A gasoline direct injection engine that has an injector directly injecting fuel into a combustion chamber, a spark plug, an intake valve, and an exhaust valve and generates power by reciprocating a piston in a cylinder, the gasoline direct injection engine, comprising:
   a cavity formed on a piston head of the piston and inclined to return some flow of the fuel injected from the injector toward the intake valve;
   a channel that is a groove formed around the cavity along an outer circumference of the piston head, wherein the channel forms a closed loop for continuously guiding fuel outside the cavity to the cavity or toward the intake valve; and
   a protrusion formed between the cavity and the channel, extending from the cavity to one side and protruding upward.

7. The gasoline direct injection engine of claim 6, wherein an intake valve recess of the inlet valve and an exhaust valve recess of the exhaust valve are not formed on the channel.

8. A gasoline direct injection engine that has an injector directly injecting fuel into a combustion chamber, a spark plug, an intake valve, and an exhaust valve and generates power by reciprocating a piston in a cylinder, the gasoline direct injection engine, comprising:
   a cavity formed on a piston head of the piston at an intake side thereof; and
   a channel formed around the cavity between the cavity and an outer circumference of the piston head;
   wherein the cavity is fluid-connected to the channel at a junction portion formed adjacent to an edge of the piston to return some flow of the fuel injected from the injector toward the intake valve along the channel;
   wherein the channel and the cavity is separated by a protrusion formed therebetween and wherein the protrusion extends from upper surface of the cavity upwards, wherein the channel forms a closed loop for continuously guiding fuel outside the cavity to the cavity or toward the intake valve; and
   wherein the protrusion opens in a part to form the junction portion such that the channel and the cavity are continuously fluid-connected therethrough.

9. The gasoline direct injection engine of claim 8, wherein the junction portion is formed adjacent to the injector.

10. The gasoline direct injection engine of claim 8, wherein the cavity is formed in a circular shape or an elliptical shape and a center thereof is offset at a predetermined distance from a center of the piston toward the injector.

11. The gasoline direct injection engine of claim 10,
   wherein the protrusion is formed in a circular shape or an elliptical shape and a center of the protrusion is offset at a predetermined distance from the center of the piston toward the injector,
   wherein the cavity is enclosed by the protrusion, and
   wherein the center of the piston, the center of the protrusion and the center of the cavity are disposed toward the injector in sequence.

12. The gasoline direct injection engine of claim 8, wherein gradient of the channel is increased from the junction portion such that a portion of the channel which is disposed farthest from the junction portion is higher than the junction portion.

13. The gasoline direct injection engine of claim 8, wherein the spark plug is disposed substantially a center of the piston.

14. The gasoline direct injection engine of claim 8, wherein an intake valve recess of the inlet valve and an exhaust valve recess of the exhaust valve are not formed on the channel.

* * * * *